US007404191B2

(12) United States Patent
Imai

(10) Patent No.: US 7,404,191 B2
(45) Date of Patent: Jul. 22, 2008

(54) INFORMATION PROCESSING APPARATUS, ITS CONTROL METHOD AND CONTROL PROGRAM

(75) Inventor: Takashi Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 10/784,261

(22) Filed: Feb. 24, 2004

(65) Prior Publication Data

US 2004/0222982 A1 Nov. 11, 2004

(30) Foreign Application Priority Data

Feb. 27, 2003 (JP) ............................ 2003-051306

(51) Int. Cl.
*G06F 3/00* (2006.01)
*G06F 9/44* (2006.01)
*G06F 9/46* (2006.01)
*G06F 13/00* (2006.01)
*G06F 13/12* (2006.01)
*G06F 13/38* (2006.01)

(52) U.S. Cl. ............................ 719/321; 710/8; 710/62

(58) Field of Classification Search ......... 719/321–327; 710/8–14, 62–64, 72

See application file for complete search history.

(56) References Cited

U.S. PATENT DOCUMENTS 5,784,581 A 7/1998 Hannah
6,052,750 A * 4/2000 Lea ............................ 710/72
6,421,069 B1 * 7/2002 Ludtke et al. ............... 715/762
6,549,958 B1 4/2003 Kuba
6,636,923 B1 10/2003 Meirsman et al.
6,754,725 B1 * 6/2004 Wright et al. .................. 710/8
7,010,624 B1 * 3/2006 Zhou et al. ..................... 710/8
2002/0029090 A1 3/2002 Bertin et al.
2002/0156947 A1 10/2002 Nishio
2003/0023804 A1 1/2003 Matsuda et al.
2003/0172223 A1 9/2003 Ying et al.
2003/0175025 A1 9/2003 Watanabe et al.
2003/0236934 A1 12/2003 Park
2004/0153597 A1 8/2004 Kanai et al.
2004/0230716 A1 * 11/2004 Imai ............................ 710/15

FOREIGN PATENT DOCUMENTS

JP 09-035026 2/1997
JP 09-305523 11/1997
JP 11-039152 2/1999
JP 2001-256167 9/2001
JP 2002-116853 4/2002
JP 2002-288112 10/2002
JP 2003-006133 1/2003

* cited by examiner

*Primary Examiner*—Meng-Ai An
*Assistant Examiner*—Qing-Yuan Wu
(74) *Attorney, Agent, or Firm*—Fitzpatrick, Cella, Harper & Scinto

(57) ABSTRACT

An information processing apparatus connectable to an external device, having a first driver storage unit to store a first driver to control a connected external device in a general-purpose manner, a determination unit to determine whether or not a second driver, to control the connected external device in a device-specific manner exists in the external device, an acquisition unit to, if the determination unit determines that the second driver exits, obtain the second driver from the connected external device, and a second driver storage unit to store the obtained second driver.

16 Claims, 4 Drawing Sheets

INFORMATION PROCESSING APPARATUS, ITS CONTROL METHOD AND CONTROL PROGRAM

FIELD OF THE INVENTION

The present invention relates to an information processing apparatus, its control method and a control program.

BACKGROUND OF THE INVENTION

In an information processing apparatus connectable to an external device such as a digital still camera, e.g., a printer or printer-based multifunction product with a digital still camera connection function, the types of connectable external devices connectable to the information processing apparatus are limited.

In such case where connectable combinations between the external devices and the information processing apparatus are limited, a user as an operator must obtain an external device such as a digital still camera and an information processing apparatus such as a printer or a printer-based multifunction product with a digital still camera connection function, corresponding to each other, at the same time.

Further, in a case where an external device such as a digital still camera with a new function is obtained, if the information processing apparatus such as a printer with a digital still camera connection function is old in comparison with the external device, the new function of the digital still camera cannot be fully performed, otherwise, in order to fully use the new function, it is necessary to prepare a new information processing apparatus such as a printer corresponding to the new function.

On the other hand, vendor-specific information on the peripheral device side can be transmitted to a PC without generating a vendor-specific PC driver by embedding the vendor-specific information (e.g., a media ID of a memory card) in general standard information and transmitting the vendor-specific information to the PC. However, the amount of transmittable information is limited, and further, vendor-specific operation control cannot be performed.

In this manner, conventionally, there is a limitation on the types of external device having a function which can be fully performed when the device is connected to an information processing apparatus, and the information processing apparatus and the external device cannot be effectively utilized.

SUMMARY OF THE INVENTION

Accordingly, the present invention enables control of external device in a general-purpose manner, and enables control with an expanded function in correspondence with an external device. More particularly, the present invention provides an information processing apparatus connectable with an external device, comprising: a first driver storage unit to store a first driver to control a connected external device in a general-purpose manner; determination means for determining whether or not a second driver to control the connected external device in a device-specific manner exists in the external device; an acquisition unit to, if it is determined that the second driver exists, obtain the second driver from the connected external device; and second driver storage means for storing the obtained second driver.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
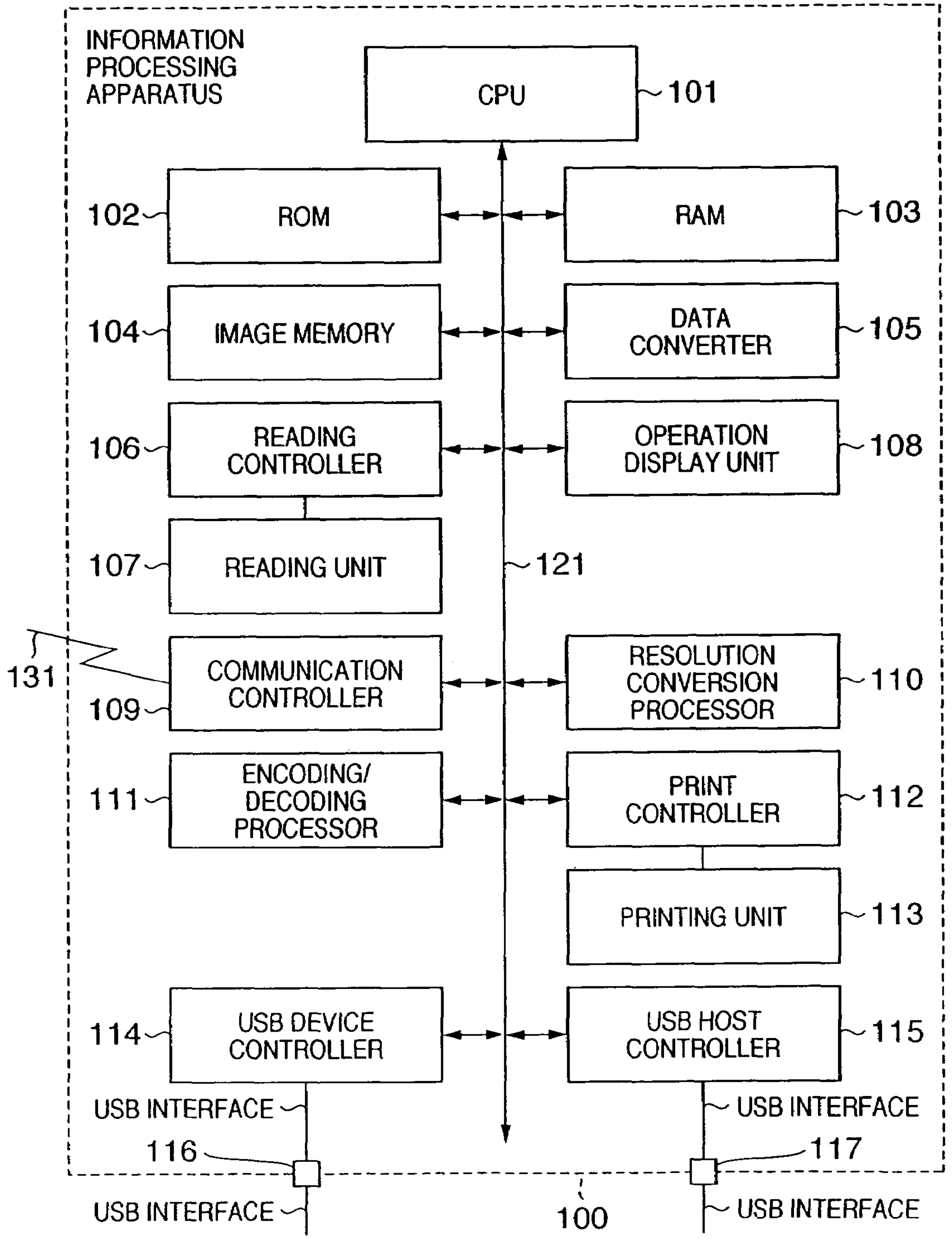
FIG. 1 is a block diagram showing a schematic construction of an information processing apparatus 100 according to an embodiment of the present invention.

First, an information processing apparatus 100 will be described in detail. In the present embodiment, the information processing apparatus 100 includes a printer or printer-based multifunction product with a connection function for external device such as a digital still camera. Further, an external device includes a digital still camera, a cellular phone or a PDA (Personal Digital Assistance) with an image sensing function. FIG. 1 is a block diagram showing a schematic construction of the information processing apparatus 100 according to an embodiment of the present invention.

In the information processing apparatus 100, a CPU 101 is a system controller which controls the overall information processing apparatus 100.

A ROM 102 holds fixed data such as control programs executed by the CPU 101, a data table and an operating system (OS) program. In the present embodiment, the various control programs stored in the ROM 102 perform software execution control such as scheduling, task switching and interruption processing under the control of the OS stored in the ROM 102, thus realize a multitask function for print control, reading control, communication control and the like. Further, a general-purpose driver to control an external device connected to a USB A connector 117, e.g., a general-purpose digital still camera, is also stored in the ROM 102. The CPU 101 operates in accordance with the general-purpose driver program, to control the external device connected to the USB A connector 117.

A RAM 103 comprises, e.g., an SRAM (Static Random Access Memory) requiring a backup power source. Data are held on the RAM 103 with a primary battery (not shown) for data backup. The RAM 103 holds program control variables and the like which must not be deleted. Further, the RAM 103 has a memory area for storing operator-registered values and management data for the information processing apparatus 100.

An image memory 104 comprises, e.g., a DRAM (Dynamic Random Access Memory). The image memory 104 mainly holds image data handled by the information processing apparatus 100, print data to be transmitted to a printing unit 113 (to be described in detail later), status information obtained from the printing unit 113 and the like. Further, a part of the image memory 104 can be ensured as a work area for execution of software processing. Further, a device-specific driver to control an external device connected to the USB A connector 117, i.e., a digital still camera, in an expanded manner, is also stored in the image memory 104. The CPU 101 operates in accordance with the device-specific driver program, to control the external device connected to the USB A connector 117 in an expanded manner.

A data converter 105 performs interpretation of PDL (Page Description Language) or the like, and performs image data conversion such as CG (Computer Graphics) mapping of character data.

In a reading controller 106, a reading unit 107 optically reads an original document with a CIS image sensor (contact image sensor), then an image signal, converted as electric image data, is subjected to various image processings such as binarization and halftone processing via an image processing controller (not shown) of the reading controller 106, and high-precision image data is outputted. It should be noted that in the present embodiment, the reading controller 106 and the reading unit 107 are available for sheet reading control for reading with a fixed CIS image sensor while conveying an original, and also are available for book reading control for scanning an original fixed on a platen with a moving CIS image sensor. The image sensor in the reading unit 107 may be CCD image sensor.

An operation display unit 108 has an operation unit with various keys, such as numeral value input keys, character input keys, single-touch telephone number keys, a mode setting key, a determination key, cancellation key and the like, for determination of image-transmission destination data and registration of preset data, an LED (light emitting diode) and an LCD (liquid crystal display) and the like. The operator's various input operations, the display of operation status of the information processing apparatus 100, and the like are made at the operation display unit 108. Further, when a warning is given to the operator, the LED flashes and warning information is displayed in the LCD.

A communication controller 109 comprises a MODEM (modulator-demodulator), an NCU (Network Control Unit) and the like. In the present embodiment, the communication controller 109 is connected to an analog communication line (PSTN) 131 for line control in T-30 protocol communication, call origination and call in to the communication line.

A resolution conversion processor 110 performs resolution conversion control such as mutual image data conversion between milli-based image data and inch-based image data. Note that in the resolution conversion processor 110, image data scaling processing is also available.

A coding/decoding processor 111 performs mutual coding/decoding or scaling on image data (non-compressed, MH, MR, MMR, JBIG, JPEG etc.) handled by the information processing apparatus 100. For example, upon printing based on image data from an external device connected to the USB A connector 117, e.g., a digital still camera, the coding/decoding processor 111 performs decoding processing on a JPEG file received from the digital still camera.

A printing controller 112 performs various image processings, such as smoothing processing, printing-density correction processing and color correction, on image data to be print-outputted, via an image processing controller (not shown), thereby converting the image data to high-precision image data and outputs the data to the printing unit 113 (to be described in detail later).

The printing unit 113 is a printing apparatus such as a laser beam printer or an ink-jet printer controlled by a specialized CPU (not shown), which performs printing on a printing medium based on color image data or monochrome image data received from the printing controller 112. Further, an EEPROM (Electrically Erasable and Programmable Read Only Memory) (not shown) not requiring a backup power source is connected in the printing controller 112 for storing printing control parameters and the like.

A USB device controller 114, including a USB analog transceiver and a serial interface engine, performs communication control on a USB interface. The USB device controller 114 performs protocol control in accordance with USB communication standards, converts data from a USB device control task executed by the CPU 101 into a packet and performs USB packet transmission to an external USB host unit (not shown) connected to the apparatus 100, and on the other hand, converts a USB packet from an external USB host unit (not shown) connected to the apparatus 100 into data and transmits the data to the CPU 101. In this manner, the USB device controller 114 realizes communication between the information processing apparatus 100 and an external USB host unit. The USB communication standards allow high-speed bidirectional data communication by 1 host (master) connected with plural devices (slaves). The USB device controller 114 has a device function in USB communication.

A USB host controller 115, including a USB analog transceiver and a serial interface engine, performs communication control on USB interface. The USB host controller 115 performs protocol control in accordance with the USB communication standards, converts data from a USB host control task executed by the CPU 101 into a packet and performs USB packet transmission to an external USB device unit (not shown) connected to the apparatus 100, on the other hand, converts a USB packet from an external USB device unit (not shown) connected to the apparatus 100 into data and transmits the data to the CPU 101. The USB communication standards allow high-speed bidirectional data communication by 1 host (master) connected with plural devices (slaves). The USB host controller 115 has a host function in USB communication.

A USB B connector 116 is a connector on the device side in conformity with the USB communication standards. It is a B type connector to be connected with an external USB host unit such as a personal computer.

The USB B connector 117 is a connector on the host side in conformity with the USB communication standards. It is an A type connector to be connected with an external USB device unit such as a digital still camera.

The above constituent elements 101 to 106, 108 to 112, 114 and 115 are interconnected via a CPU bus 121 under the control of the CPU 101.

Next, the data arrangement in the ROM 102 and the image memory 104 of the information processing apparatus 100 will be described in detail.

Figure 2:
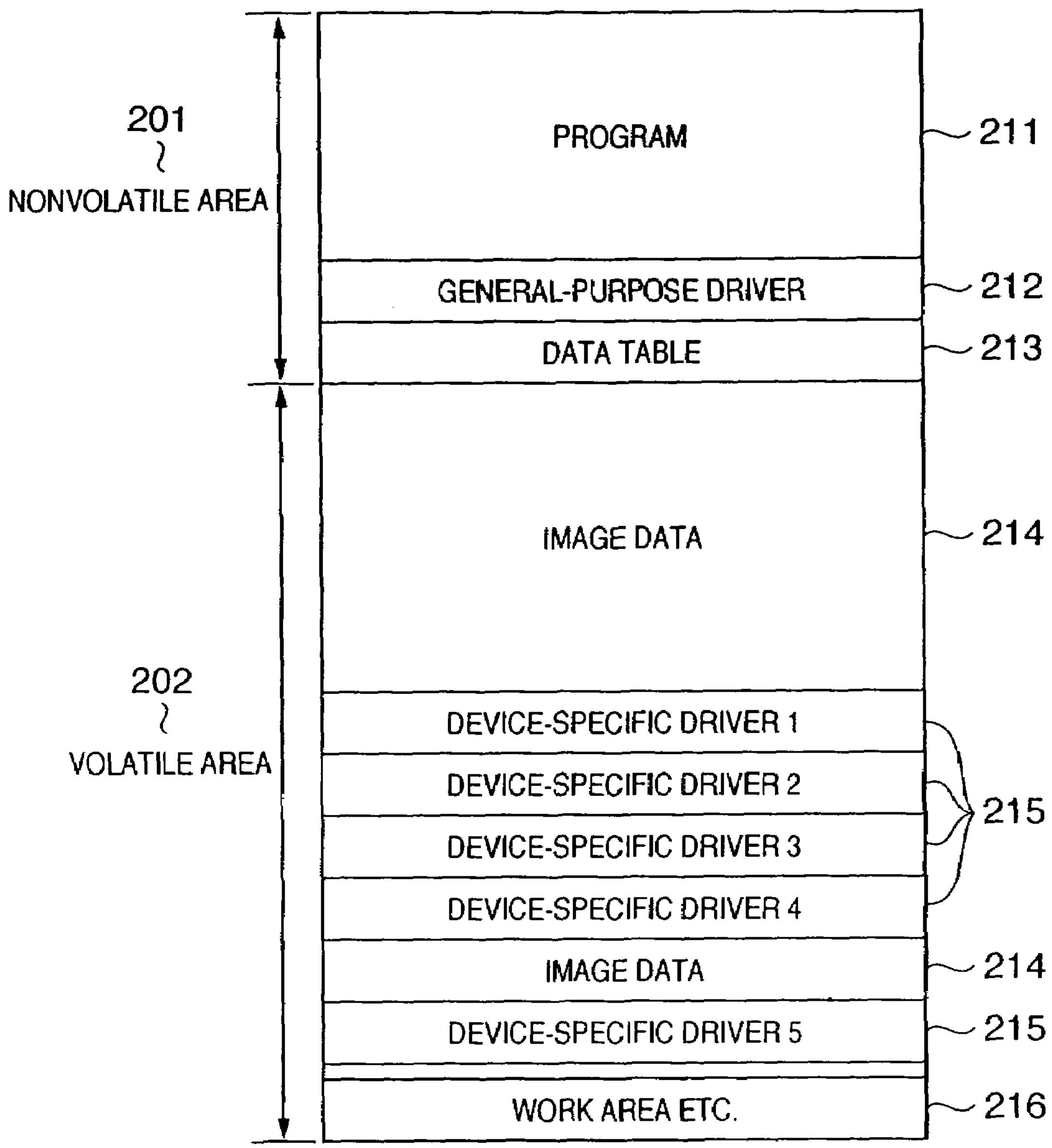
FIG. 2 is an example of memory mapping in a ROM 102 and an image memory 104 of the information processing apparatus 100, according to the embodiment of the present invention.

FIG. 2 is an example of memory mapping showing storage areas of the ROM 102 and an image memory 104 of the information processing apparatus 100.

The entire nonvolatile area 201 corresponds to the ROM 102 of the information processing apparatus 100. The entire volatile area 202 corresponds to the image memory 104 of the information processing apparatus 100. First, the nonvolatile area 201 will be described in detail.

A program area 211 in the nonvolatile area 201 is a program area where control programs executed by the CPU 101, an operating system (OS) program and the like are stored. When the power of the information processing apparatus 100 is turned on, the CPU 101 of the information processing apparatus 100 starts its operation in accordance with program code stored in the program area 211.

A general-purpose driver area 212 in the nonvolatile area 201 is a program area where a control program for the CPU 101 to control an external device connected to the USB A connector 117 of the information processing apparatus 100 in a general-purpose manner is stored. The control program to control the external device in a general-purpose manner is a control program to control an external device to realize communication in accordance with control standards standardized by a standardization organization, or de facto standard control standards.

For example, a function of downloading and print-outputting an image obtained by the information processing apparatus 100, a function of displaying a printing status on an external device connected to the apparatus, or the like, are attained by general-purpose control.

A data table area 213 in the nonvolatile area 201 is a data table area holding a data table referred to upon execution of processing by the CPU 101 of the information processing apparatus 100.

Next, the volatile area 202 will be described in detail. An image data area 214 in the volatile area 202 is an area where image data handled in the information processing apparatus 100, print data transmitted to the printing unit 113 of the information processing apparatus 100, status information obtained from the printing unit 113, and the like, are stored. As shown in FIG. 2, since the image data area 214 is dynamically ensured upon storage of image data or the like, plural image data areas 214 may exist separately.

A device-specific driver area 215 in the volatile area 202 is a device-specific driver area holding a device-specific driver for the CPU 101 of the information processing apparatus 100 to control an external device connected to the USB A connector 117 of the information processing apparatus 100, i.e., a digital still camera, in an expanded manner. The device-specific driver is a driver unique to the external device such as a digital still camera, made by its maker's own method. The device-specific driver cannot be utilized in a general-purpose manner in digital still cameras of other makers. The device-specific driver corresponds to only the maker-specific or the device-specific function (for example, a function of enabling selection of printing mode unique to the maker and enable printing in the unique printing mode). Regarding general-purpose functions (e.g., downloading and print-outputting an image obtained by image sensing by the information processing apparatus 100), the device-specific driver may be used with a general-purpose driver. Further, it may be arranged such that all the functions provided from a digital still camera including the general-purpose functions are realized only by the device-specific driver.

As described later with reference to FIG. 3, since the device-specific driver area 215 is dynamically ensured upon reception and storage of device-specific driver from an external device connected to the USB A connector 117 of the information processing apparatus 100, plural device-specific driver areas 215 away from each other may exist.

A work area 216 in the volatile area 202 is a work area where work data or the like used by the CPU 101 of the information processing apparatus 100 for execution of software processing is stored.

Next, a control flow in a case where a digital still camera is connected to the information processing apparatus 100 and image data in the digital camera is print-outputted will be described in detail.

Figure 3:
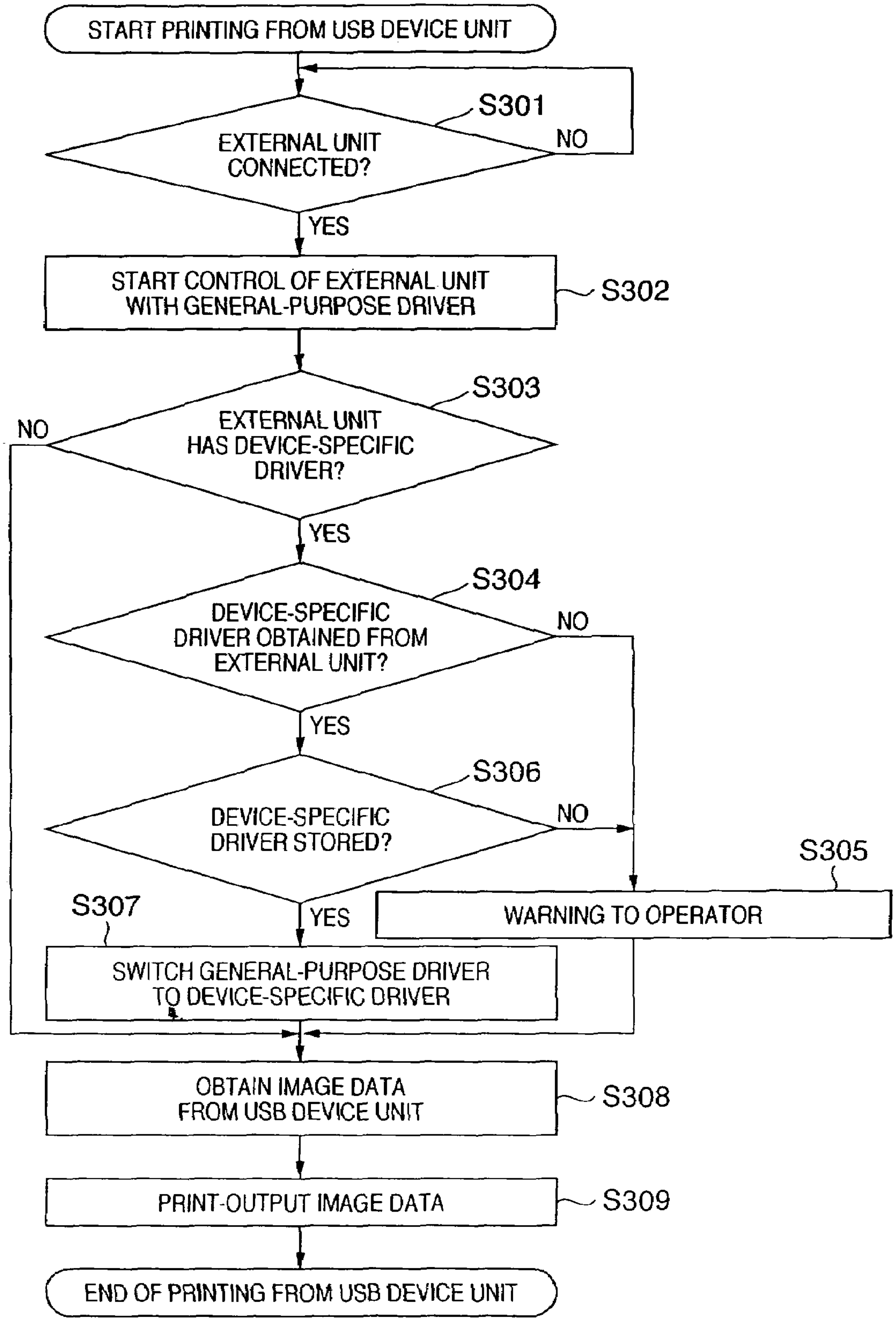
FIG. 3 is a flowchart showing an example of processing in a case where a USB device unit is connected to the information processing apparatus 100, according to the embodiment of the present invention.

FIG. 3 is a flowchart showing an example of processing in a case where a digital still camera is connected to the information processing apparatus 100 and image data in the digital camera is print-outputted. Note that a description will be provided on the assumption that the entire information processing apparatus 100 has been initialized by the CPU 101 prior to execution of the present flowchart and the information processing apparatus 100 is in a standby status waiting for operation start.

At step S301, the CPU 101 detects via the USB host controller 115 whether or not an external device, i.e., a digital still camera, has been connected to the USB A connector 117. The detection as to whether or not a digital still camera has been connected to the USB A connector 117 is made by the CPU 101 using a mechanical hardware switch (not shown) via the USB host controller 115. Further, the detection of connection may be realized by the USB host controller 115 using a mechanical hardware switch (not shown) and the result of detection may be notified to the CPU 101. Further, the mechanical hardware switch may be replaced with an electrical state switch. Further, the mechanical hardware switch may be replaced with software data communication result.

If the CPU 101 determines at step S301 that a digital still camera has been connected to the USB A connector 117, the process flow proceeds to step S302. On the other hand, if the CPU 101 determines at step S301 that a digital still camera has not been connected to the USB A connector 117, the process flow repeats step S301.

At step S302, the CPU 101 starts control of the digital still camera connected to the USB A connector 117 in accordance with a general-purpose driver control program to control a general-purpose digital still camera stored in the ROM 102. The control of digital still camera is made as follows. First, communication specification information of the digital still camera connected to the USB A connector 117 and digital still camera information are obtained. If the digital still camera is in conformity with the USB communication standards, information on the version of the USB communication standards, the USB class code, the communication-pipe packet size and the like can be obtained from the communication specification information. Further, information on the name of maker of the digital still camera, the product name and the like can be obtained from the digital still camera information. Next, the digital still camera connected to the USB A connector 117 is initialized. Thereafter, the process flow proceeds to step S303.

At step S303, the CPU 101 determines from the information obtained at step S302 whether or not the digital still camera connected to the USB A connector 117 has a device-specific driver to control the digital still camera. The determination as to whether or not the connected camera has a device-specific driver is made as follows. A table of names of the makers of digital still cameras having device-specific drivers and the product names is registered in a data table area 213 of the ROM 102 in the information processing apparatus 100 in advance, The CPU 101 compares the maker name and the product name obtained at step S302 with the data registered in the data table area 213 of the ROM 102, thereby determining whether or not the digital still camera connected to the USB A connector 117 has a device-specific driver.

If the CPU 101 determines at step S303 that the digital still camera connected to the USB A connector 117 has a device-specific driver to control the digital still camera, the process flow proceeds to step S304.

Note that at step S303, it can be determined whether or not the connected camera supports "device-specific communication procedure" to be described later based on the maker name and the product name of the camera. If the camera supports the device-specific communication procedure, as a communication path is established, the device-specific driver can be reliably obtained.

If the CPU 101 determines at step S303 that the digital still camera connected to the USB A connector 117 does not have a device-specific driver to control the digital still camera, the process flow proceeds to step S308.

At step S304, the CPU 101 receives the device-specific driver from the digital still camera connected to the USB A connector 117, and determines whether or not the driver has been normally received. The reception of device-specific driver from the connected digital still camera is made as follows.

A digital still camera having a device-specific driver can operate in a general-purpose device-specific driver transmission mode for transmission of device-specific driver. The CPU 101 controls the USB host controller 115 to set the connected digital still camera in the device-specific driver transmission mode by the device-specific communication procedure. Then, the CPU 101 receives the device-specific driver from the connected digital still camera by the device-specific communication procedure.

If the CPU 101 has normally received the device-specific driver from the digital sill camera at step S304, the process proceeds to step S306. On the other hand, if the CPU 101 has not normally received the device-specific driver from the digital still camera at step S304, the process flow proceeds to step S305.

At step S305, the CPU 101 controls the operation display unit 108 to give a warning to the operator. More specifically, a message "Specialized driver to control connected device has not been received. Device operates by a lower-function standard driver." or the like is displayed on a display such as a LCD of the operation display unit 108, and the LED blinks. Thereafter, the process flow proceeds to step S308.

If the device-specific driver has been normally received at step S304, then at step S306, the device-specific driver obtained from the digital still camera at step S304 is stored in the device-specific driver area 215 of the image memory 104, and it is determined whether or not the storage has been normally completed. The storage of device-specific driver into the device-specific driver area 215 of the image memory 104 is made as follows.

First, the CPU 101 checks an available area of the volatile area 202. The volatile area 202 includes the image data area 214 and the work area 216 as well as the device-specific driver area 215. The CPU 101 newly allocates an a unused area in the volatile area 202 to the device-specific driver area 215. Then the CPU 101 stores the device-specific driver obtained from the digital still camera at step S304 into the newly allocated device-specific driver area 215.

Further, the determination as to whether or not the storage of device-specific driver has been normally completed is made as follows.

When the CPU 101 checks an available area of the volatile area 202, if a large amount of image data has been received and the image data area 214 occupies the volatile area 202, the CPU 101 cannot ensure an available area of the volatile area 202 and cannot normally store the device-specific driver. In such case, it is determined that the storage of device-specific driver has not been normally completed.

Further, when the CPU 101 stores the device-specific driver obtained from the digital still camera at step S304 into the newly allocated device-specific driver area 215, the CPU 101 writes the device-specific driver into the device-specific driver area 215, then reads the device-specific driver from the digital still camera again, and compares the written device-specific driver with the read device-specific driver. If some difference between both data has been detected, the CPU 101 also determines that the storage of device-specific driver has not been normally completed.

If the CPU 101 determines at step S306 that the storage of device-specific driver has been normally completed, the process flow proceeds to step S307. On the other hand, if the CPU 101 determines at step S306 that the storage of device-specific driver has not been normally completed, the process flow proceeds to step S305.

At step S307, the CPU 101 changes control of the digital still camera connected to the USB A connector 117, which was performed in accordance with a general-purpose driver control program, to control a general-purpose digital still camera, stored in the general-purpose driver area 212 of the ROM 102, which was also performed in accordance with a control program of the device-specific driver stored at step S306 in the device-specific driver area 215 of the image memory 104. Thereafter, the process flow proceeds to step S308.

At step S308, if the operator performs a printing operation at the operation unit (not shown) of the digital still camera connected to the USB A connector 117, the CPU 101 of the information processing apparatus 100 detects the printing operation, then receives image data from the digital still camera connected to the USB A connector 117. Generally, image data held in the digital still camera is stored in the form of JPEG compressed files in plural folders. Thereafter, the process flow proceeds to step S309.

At step S309, the CPU 101 processes the image data obtained from the digital still camera at step S308, outputs print data to the print controller 112, thereby performing the printing processing. The image data processing performed by the CPU 101 includes the following processing.

First, as the image data received from the digital still camera is compressed by the JPEG method, the CPU.101 controls the coding/decoding processor 111 thereby decoding the JPEG-compressed file format data to raw data. Then the CPU 101 performs image processing such as color space processing on the raw image data in correspondence with the printing unit 113. Then the CPU 101 transfers the image-processed raw image data to the print controller 112. As a result, the image data is print-outputted to a printing medium in the printing unit 113.

In the above description, the data table area 213 is ensured in the ROM 102 as the nonvolatile area 201. However, the present invention is not limited to this arrangement. For example, the information processing apparatus 100 may further have storage means as a data table memory in addition to the ROM 102 or the image memory 104. In this case, it is preferable that the data table memory is an electrically-rewritable storage means (e.g., EEPROM).

If the information processing apparatus has such data table memory, it can obtain the latest information on the maker name, the product name and the like of a digital still camera having a device-specific driver via the communication line 131, and update the data table using the obtained information. In this arrangement, even if a new digital still camera having a latest function has been put on sale, a device-specific driver to realize the latest function can be obtained on the information processing apparatus 100 side.

Next, a description will be provided in detail about a control flow in a case where a list of drivers stored in the general-purpose driver area 212 and the device-specific driver area 215 of the information processing apparatus 100 is displayed on the operation display unit 108, and a selectively-designated device-specific driver stored in the device-specific driver 215 is deleted.

Figure 4:
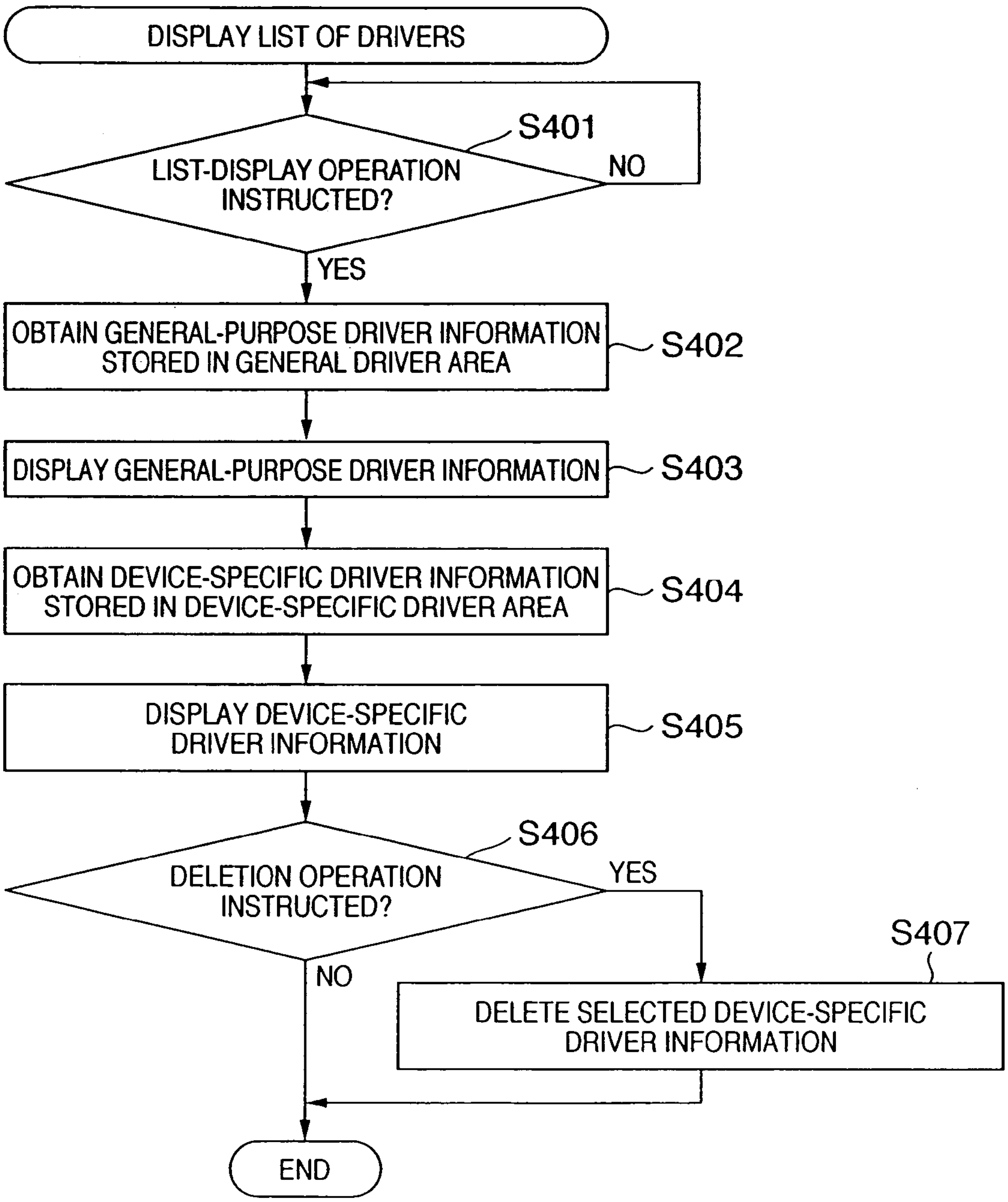
FIG. 4 is a flowchart showing an example of processing for device-specific driver in the information processing apparatus 100, according to the embodiment of the present invention.

FIG. 4 is a flowchart showing in detail a control flow in a case where a list of drivers stored in the general-purpose driver area 212 and the device-specific driver area 215 of the information processing apparatus 100 is displayed on the operation display unit 108, and a selectively-designated device-specific driver stored in the device-specific driver 215 is deleted. Note that a description will be provided on the assumption that the entire information processing apparatus 100 has been initialized by the CPU 101 prior to execution of the present flowchart and the information processing apparatus 100 is in a standby status waiting for operation start.

At step S401, the CPU 101 monitors the operation display unit 108, and determines whether or not an operation to display the list of drivers stored in the general-purpose driver area 212 and the device-specific driver area 215 has been performed by the operator. The operation to display the list of drivers by the operator may be made by using a specialized driver list display button (not shown) as a single-touch operation, and otherwise, the operation may be made by tracking a hierarchy from a menu button (not shown).

If it is determined at step S401 that an operation to display the list of stored drivers has been performed, the process flow proceeds to step S402. On the other hand, if it is determined at step S401 that an operation to display the list of stored drivers has not been performed, the process flow repeats step S401.

At step S402, the CPU 101 obtains information on the general-purpose drivers stored in the general-purpose driver area 212 of the ROM 102. The general-purpose driver information means, e.g., the type of general-purpose driver, the version number, the date of generation, corresponding models, the data size and the like. Thereafter, the process flow proceeds to step S403.

At step S403, the CPU 101 controls the operation display unit 108, thereby displaying the general-purpose driver information obtained at step S402 on the display unit such as a LCD of the operation display unit 108. Thereafter, the process flow proceeds to step S404.

At step S404, the CPU 101 obtains information on the device-specific drivers stored in the device-specific driver area 215 of the image memory 104. The device-specific driver means, the type of device-specific driver, the version number, the date of generation, the date of storage, corresponding models, the data size and the like. Thereafter, the process flow proceeds to step S405.

At step S405, the CPU 101 controls the operation display unit 108 thereby displaying the device-specific driver information obtained at step S404 on the display unit such as LCD of the operation display unit 108. Thereafter, the process flow proceeds to step S406.

At step S406, the CPU 101 monitors the operation display unit 108, and determines whether or not an operation to delete a device-specific driver displayed on the display unit such as LCD of the operation display unit 108 has been performed by the operator. The operation to delete a device-specific driver by the operator may be made by using a specialized device-specific driver deletion button (not shown) as a single-touch operation, and otherwise, the operation may be made by tracking a hierarchy from a menu button (not shown).

If it is determined at step S406 that an operation to delete a displayed device-specific driver has been performed, the process flow proceeds to step S407. On the other hand, if it is determined at step S406 that an operation to delete a displayed device-specific driver has not been performed, the process flow ends.

At step S407, the CPU 101 performs deletion of the device-specific driver designated by the operator at step S406. When the device-specific driver has been deleted from the device-specific driver area 215, the available area of the volatile area 202 is enlarged. Thereafter, the process flow ends.

In the present control flow, the list of drivers stored in the general-purpose driver area 212 and the device-specific driver area 215 of the information processing apparatus 100 is displayed on the operation display unit 108, and a selectively designated device-specific driver stored in the device-specific driver area 215 is deleted. The control flow may be applied to a case where the list of drivers stored in the general-purpose driver area 212 and the device-specific driver area 215 of the information processing apparatus 100 is printed by the printing unit 113, and a selectively designated device-specific driver stored in the device-specific driver area 215 is deleted.

More specifically, the present control flow can be modified as a control flow in the case where the list of drivers stored in the general-purpose driver area 212 and the device-specific driver area 215 of the information processing apparatus 100 is printed by the printing unit 113, and a selectively designated device-specific driver stored in the device-specific driver area 215 is deleted, simply by replacing “list display operation” at step S401 with “list printing operation”, replacing “display general-purpose driver information” at step S403 with “print general-purpose driver information”, and replacing “display device-specific driver information” at step S405 with “print device-specific driver information”.

As described, above, according to the present invention, a general-purpose external device can be reliably controlled in accordance with generalized communication standards, on the other hand, when a special external device is connected, the external device can be controlled with an expanded function.

Further, a general-purpose external device can be reliably controlled in accordance with generalized communication standards.

Further, the device-specific drivers stored in the information processing apparatus 100 can be freely changed by the operator.

Further, it is not necessary to previously store all the device-specific drivers to control different external devices in the information processing apparatus 100. Further, it is possible for the operator to freely select any combination between the external devices and the information processing apparatus 100. Furthermore, even in the combination between an external device with a new function and an old information processing apparatus 100, it is possible to fully control the external device with new function by obtaining a device-specific driver corresponding to the new function. Accordingly, more reliable operations can be provided to the operator.

Further, since it is not necessary to re-transmit a unit-specific driver from external device unless data stored in the device-specific driver area 215 in the information processing apparatus 100 is deleted, it is possible for the operator to quickly perform a processing operation.

Further, as the device-specific driver area 215 can be ensured, with other arbitrary area(s), in the image memory 104, effective utilization of the storage can be realized, and the cost of the information processing apparatus can be reduced.

Further, as the information processing apparatus 100 has means for giving a warning to the operator in a case where there is no area to dynamically store a device-specific driver in the image memory 104, the operation status can be notified to the operator, thereby permitting the operator side to take a countermeasure. This also provides more reliable operations.

As described above, according to the present invention, an external device can be controlled in a general-purpose manner, and can be controlled with an expanded function in correspondence with the external device.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM,. DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:

an external device connection unit configured to connect an external device;

a first driver storage unit configured to store a first driver to control the connected external device in a general-purpose manner;

a determination unit configured to determine whether or not a second driver to control the connected external device in a device-specific manner exists in the external device;

an acquisition unit configured to, if said determination unit determines that the second driver exists, obtain the second driver from the connected external device; and an image data storage unit configured to store image data, wherein said image data storage unit is a volatile storage unit;

a controller for controlling a storage operation of said second driver, wherein said controller assigns a vacant area in said image data storage unit to a new second driver to be stored, and if there is no vacant area in said image data storage unit, upon a reception of an instruction from an operator of said information processing apparatus to delete said second driver already stored in said image data storage unit, said controller deletes said second driver selected by the operator from the image data storage unit;

a third storage unit configured to store information on the existence/absence of the second driver in the connected external device; and a update unit configured to update the information, wherein said determination unit determines the existence/absence of the second driver to control the connected external device in the device-specific manner in the connected external device, based on the updated information stored in said third storage unit.

2. The information processing apparatus according to claim 1, further comprising a driver switching unit configured to select one of the first driver and the second driver as a driver to control the external device in accordance with the connected external device.

3. The information processing apparatus according to claim 1, wherein said first driver storage unit is a nonvolatile storage unit.

4. The information processing apparatus according to claim 1, further comprising a warning unit configured to provide a warning to the operator if said determination unit determines that the second driver does not exist.

5. The information processing apparatus according to claim 4, wherein said warning unit provides the warning in a case where the second driver cannot be stored in said image data storage unit due to the available capacity of said image data storage unit being insufficient.

6. The information processing apparatus according to claim 5, wherein said warning unit provides the warning in a case where data of said second driver stored in said image data storage unit, as a result of a first acquisition operation during which the second driver is acquired from the connected external device and stored in the image data storage unit, is compared with data of the second driver obtained from the connected external device during a second acquisition operation during which the second driver is acquired again from the connected external device and there is a difference between the data of said stored second driver acquired in the first acquisition operation and data of the obtained second driver acquired in the second acquisition operation.

7. The information processing apparatus according to claim 1, further comprising a display unit configured to display information on the second driver stored in said image data storage unit.

8. The information processing apparatus according to claim 1, further comprising a deletion unit configured to delete the second driver from said image data storage unit if an instruction to delete the second driver from said image data storage unit is received.

9. A control method for an information processing apparatus having an external device connection unit to connect an external device, a first driver storage unit to store a first driver to control the connected external device in a general-purpose manner, and an image data storage unit to store image data, the image data storage unit being a volatile storage unit, comprising:

- a determination step of determining whether or not a second driver to control the connected external device in a device-specific manner exists in the external device;
- an acquisition step of, if it is determined at said determination step that the second driver exists, obtaining the second driver from the connected external device; and
- a storage step of storing the obtained second driver into the image data storage unit,
  - wherein in said storage step, a vacant area in said image data storage unit is assigned to a new second driver to be stored, and if there is no vacant area in said image data storage unit, upon a reception of an instruction from an operator of said information processing apparatus to delete said second driver already stored in said image data storage unit, said second driver selected by the operator is deleted from the image data storage unit;
- a second storage step of storing information in to a third storage unit on the existence/absence of the second driver in the connected external device; and
- an update unit updating step of updating the information,
- wherein at said determination step, a determination is made as to the existence/absence of the second driver to control the connected external device in the device-specific manner in the connected external device, based on the updated information stored in the third storage unit.

10. The control method according to claim 9, further comprising a driver switching step of selecting one of the first driver and the second driver as a driver to control the external device in accordance with the connected external device.

11. The control method according to claim 9, wherein the first driver storage unit is a nonvolatile storage unit.

12. The control method according to claim 9, further comprising a warning step of providing a warning to the operator of if it is determined at said determination step that the second driver does not exist.

13. The control method according to claim 12, wherein at said warning step, the warning is given in a case where the second driver cannot be stored in the image data storage unit due to the available capacity of the image data storage unit being insufficient.

14. The control method according to claim 12, wherein at said warning step, said warning is provided in a case where data of said second driver stored in said image data storage unit, as a result of a first acquisition operation during which the second driver is acquired from the connected external device and stored in the image data storage unit, is compared with the second driver obtained from the connected external device during a second acquisition operation during which the second driver is acquired again from the connected external device and there is a difference between the data of the stored second driver acquired in the first acquisition operation and data of the obtained second driver obtained in the second acquisition operation.

15. The control method according to claim 9, wherein the information processing apparatus further comprises a display unit to display information on the second driver stored in the image data storage unit.

16. A computer-readable medium storing thereon a control program for causing a computer to execute a control method for an information processing apparatus having an external device connection unit to connect an external device, a first driver storage unit to a store a first driver to control the connected external device in a general-purpose manner, and an image data storage unit to store image data, the image data storage unit being a volatile storage unit, said control method comprising:

- a determination step of determining whether or not a second driver to control the connected external device in a device-specific manner exists in the external device;
- an acquisition step of, if it is determined at said determination step that the second driver exits, obtaining the second driver from the connected external device; and
- a storage step of storing the obtained second driver into the image data storage unit,
  - wherein in said storage step, a vacant area in said image data storage unit is assigned a new second driver to be stored, and if there is no vacant area in said image data storage unit, upon a reception of an instruction from an operator of said information processing apparatus to delete said second driver already stored in said image data storage unit, said second driver selected by the operator is deleted from the image data storage unit;
- a third storage unit step of storing information on the existence/absence of the second driver in the connected external device; and
- an update unit updating step of updating the information,
  - wherein at said determination step, a determination is made as to the existence/absence of the second driver to control the connected external device in the device-specific manner in the connected external device, based on the updated information stored in the third storage unit.

* * * * *

UNITED STATES PATENT AND TRADEMARK OFFICE

CERTIFICATE OF CORRECTION

PATENT NO. : 7,404,191 B2
APPLICATION NO. : 10/784261
DATED : July 22, 2008
INVENTOR(S) : Takashi Imai It is certified that error appears in the above-identified patent and that said Letters Patent is hereby corrected as shown below:

ON THE TITLE PAGE
Item (57) Abstract:
Line 8, "exits," should read --exists,--.

COLUMN 3:
Line 28, "CCD" should read --a CCD--.

COLUMN 7:
Line 48, "a" should be deleted.

COLUMN 10:
Line 32, "described," should read --described--.

COLUMN 12:
Line 23, "and" should be deleted.
Line 26, "unit;" should read --unit; and--.

COLUMN 13:
Line 43, "in to" should read --into--.
Line 60, "of" should be deleted.

COLUMN 14:
Line 36, "exits," should read --exists,--.

Signed and Sealed this

Tenth Day of February, 2009

JOHN DOLL
*Acting Director of the United States Patent and Trademark Office*